US011514081B2

(12) United States Patent
Kanuri et al.

(10) Patent No.: US 11,514,081 B2
(45) Date of Patent: Nov. 29, 2022

(54) BUILDING PROFILES FOR CLUSTERS WITH SMART UNION OF INDIVIDUAL PROFILES

(71) Applicant: Yahoo Holdings, Inc., Sunnyvale, CA (US)

(72) Inventors: Kaylan Kanuri, Sunnyvale, CA (US); Wendell Baker, Palo Alto, CA (US); Alvaro Mendez, Sunnyvale, CA (US); Gergely Timar, Sunnyvale, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 526 days.

(21) Appl. No.: 15/253,062

(22) Filed: Aug. 31, 2016

(65) Prior Publication Data

US 2018/0060411 A1    Mar. 1, 2018

(51) Int. Cl.
*G06F 16/28*     (2019.01)
*H04L 67/306*    (2022.01)
*H04L 67/50*     (2022.01)

(52) U.S. Cl.
CPC .......... *G06F 16/285* (2019.01); *H04L 67/306* (2013.01); *H04L 67/535* (2022.05)

(58) Field of Classification Search
None
See application file for complete search history.

(56) References Cited

U.S. PATENT DOCUMENTS

| 9,292,361  | B1* | 3/2016  | Chitilian   | G06Q 30/0277 |
|------------|-----|---------|-------------|--------------|
| 2004/0073520 | A1* | 4/2004 | Eskandari   | G06Q 30/02   |
|            |     |         |             | 705/400      |
| 2008/0120339 | A1* | 5/2008 | Guan        | G06Q 10/10   |
| 2008/0227063 | A1* | 9/2008 | Kenedy      | G16H 50/30   |
|            |     |         |             | 434/219      |
| 2012/0317217 | A1* | 12/2012 | Lavy       | G06F 21/32   |
|            |     |         |             | 709/206      |
| 2013/0124333 | A1* | 5/2013 | Doughty     | G06Q 30/0255 |
|            |     |         |             | 705/14.66    |
| 2014/0359784 | A1* | 12/2014 | Taysom     | G06F 21/6254 |
|            |     |         |             | 726/26       |
| 2015/0067118 | A1* | 3/2015 | Gatto       | H04L 63/06   |
|            |     |         |             | 709/223      |
| 2015/0287091 | A1* | 10/2015 | Koran      | G06Q 30/0277 |
|            |     |         |             | 705/14.66    |
| 2016/0103842 | A1* | 4/2016 | Choromanski | G06K 9/6255  |
|            |     |         |             | 707/737      |
| 2017/0134232 | A1* | 5/2017 | Palanciuc   | H04L 41/0816 |
| 2017/0346821 | A1* | 11/2017 | Yedidi     | H04L 63/0876 |

* cited by examiner

*Primary Examiner* — Giuseppi Giuliani
(74) *Attorney, Agent, or Firm* — Cooper Legal Group LLC

(57) ABSTRACT

A system for generating a cluster profile is provided. The system may include a server and a database. The server may be configured to receive event information from a plurality of consumer devices. The database may store a plurality of member profiles. The server may be configured to retrieve the member profiles from the database and may determine a subset of member profiles to associate with a cluster; the server may calculate an intersection of the facts from the subset of member profiles and may generate a cluster profile based on the intersection of the facts from the subset of member profiles.

17 Claims, 3 Drawing Sheets

BUILDING PROFILES FOR CLUSTERS WITH SMART UNION OF INDIVIDUAL PROFILES

BACKGROUND

1. Field of the Invention

The present invention generally relates to generating cluster profiles.

SUMMARY

A system for generating a cluster profile is provided. The system may include a server and a database. The server may be configured to receive event information from a plurality of consumer devices. The database may store a plurality of member profiles. The server may be configured to retrieve the member profiles from the database and may determine a subset of member profiles to associate with a cluster; the server may calculate an intersection of the facts from the subset of member profiles and may generate a cluster profile based on the intersection of the facts from the subset of member profiles.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

The drawings described herein are for illustration purposes only and are not intended to limit the scope of the present disclosure in any way.

It should be understood that throughout the drawings, corresponding reference numerals indicate like or corresponding parts and features.

DETAILED DESCRIPTION

Figure 1:
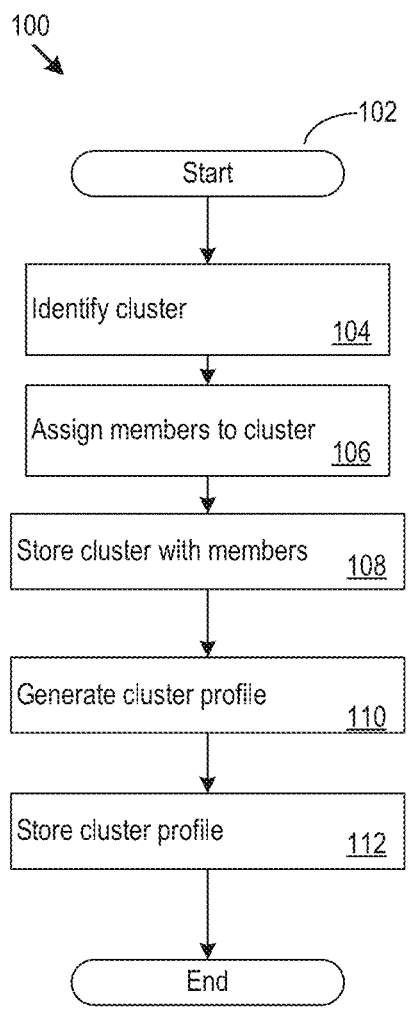
FIG. 1 is a flowchart illustrating a method for generating cluster profiles.

When consumers consent to sign in to Yahoo, the identification of the consumer within a device, across multiple devices and on other web properties is as easy as consulting the consumer's secure identity token. However, a significant use axis both for Yahoo Owned & Operated (O&O) and Yahoo's syndication media partners is the identification of consumers who are not registered with Yahoo, or who have registered with Yahoo but have done so on some other device or some other application. The expectation and desire is that consumers are constantly and transparently identifiable across the supply. Where consumers share devices, switch devices in mid-session or where they do not need to register their devices with Yahoo, the expectation of visibility becomes increasingly precarious. In turn, this reduces the targeting systems efficacy and consequently the ad marketplaces ability to transact the media supply which has been entrusted to it.

A series of systems have been designed which seek to use all available information about consumer behavior to tie ongoing consumer contacts in the anonymous and unregistered state with high-fidelity profiles that have been developed using the consumers which do choose to register with Yahoo. The challenge of the unregistered devices and consumers may be addressed at two levels: deterministic associations may be used to identify the registered and unregistered equipment of the same person across time and supply, and probabilistic reasoning may be applied against pseudonymous associations to provide estimations of participation in cluster groupings, for example household groupings where members live together or workplace groupings where members work together. The deterministic methods may be applied to provide traditional features of content selection, marketing, and other grouping applications: attribution & conversion counting, targeting & profile construction, and frequency capping. The probabilistic methods may be applied towards broader background characterizations of the cluster, for example the household in which the consumers live. This aligns well with situations where demand response methods are addressed as individuals whereas brand oriented or demand generation methods address larger groupings such as households, workplaces, or neighborhoods.

Targeted messaging applications in the online and offline spheres depends upon being able to distinguish repeated appearances of individuals to the monetization systems. This is an addressability concern which could have been simplistically handled through a combination of assumptions about the consumer premises equipment (CPE), slow-moving & consistent consumer behavior and low expectations from the marketing industry at large. In the early years of the internet, the technology of the day had limited reach exemplified in the metric of one or fewer computers per household, and media time-of-use studies showed that residential media use and business media use dayparts were substantially disjoint. These broad themes were supported by technical aspects such as the ability for ad systems to force-place unique identifier tokens on the consumer's equipment, the treatment of HTML4 cookies as substantially secure containers for those consumer identification tokens. All these put together made for a very simple consumer identification regime based on unique identifiers stored in HTML4 cookies. Cookie equaled device equaled person. One counts the cookie identifiers and one measures the audience.

Recently many of these assumptions have fallen: the valuable subset of consumers has many devices per person; they share devices and even within a device, the security architecture of modern operating systems attempts to isolate individual applications "as if" each application was operating in isolation from all the others. Further complicating matters, a major use axis is transparent operation wherein consumers are not required to register with anyone at all in order for the audience management and ad marketplaces to operate. While such machinery might work better if registration (sign-in) occurs, they still need to operate with fidelity when the consumer remains substantially anonymous or pseudonymous.

Yahoo is among but a few online entertainment systems where the delivered experience can be presented to the consumer without first requiring the consumer to register. This is not true of many of Yahoo's competitors, where registration is required to use their products in any meaningful way. As well, registration free operation is also the situation for in the realm of pure-play media trading which occurs beyond Yahoo Owned & Operated (O&O) network and where Yahoo now participates as a principal.

Many applications would benefit if consumers were never expected to explicitly register with any system in order to have messages delivered onto their equipment. The systems are expected to "just know" who the consumer is and "just work." The promise of online media monetization is of an addressable person. The industry is able to operate with significant approximations to the addressable person in the form of surrogates such as the addressable browser or addressable (handset) device, albeit with reduced fidelity, supports in the major use cases of content selection, advertising, and other applications: attribution, targeting and frequency capping.

FIG. 1 is a flowchart illustrating a method 100 for generating cluster profiles. The method 100 starts in block 102. In block 104, individual members are identified, for example based on usage patterns and access information such as IP address, geo-location, associated accounts, devices, etc. The individual members may be stored in a database for later access.

Usage patterns and the addressability expectation may be addressed on a separable basis. Further, different techniques may be applied to different connectivity modes. This establishes the need for a separate and flexible identity stage which operates prior to and independent of the other stages in the monetization pipeline.

The problem addressed by the identity stage is the development of an estimation of the person at the other end of the information-poor communication channel ("on the other end of the wire"), and failing that, the development of an estimation of the device instance and failing that an estimation of the software agent instance (browser or app) on the device. In each of these cases, the estimation takes the form of rederiving addressability in the form of applying a unique identifier which names the instance of the class of interest: person, device, software.

In particular, one can observe that this identification problem is "easy" if the consumer cooperates in the process. If the consumer registers with the identity stage, e.g. if the consumer signs in to Yahoo, then they have disclosed themselves to the system. The system may take advantage of this to the maximum extent. Of course, the Yahoo Membership system may be used for consumer registration. As such, the fully registered modality of the Single Sign-On (SSO) consumer may be taken as a wholly solved case.

Figure 2:
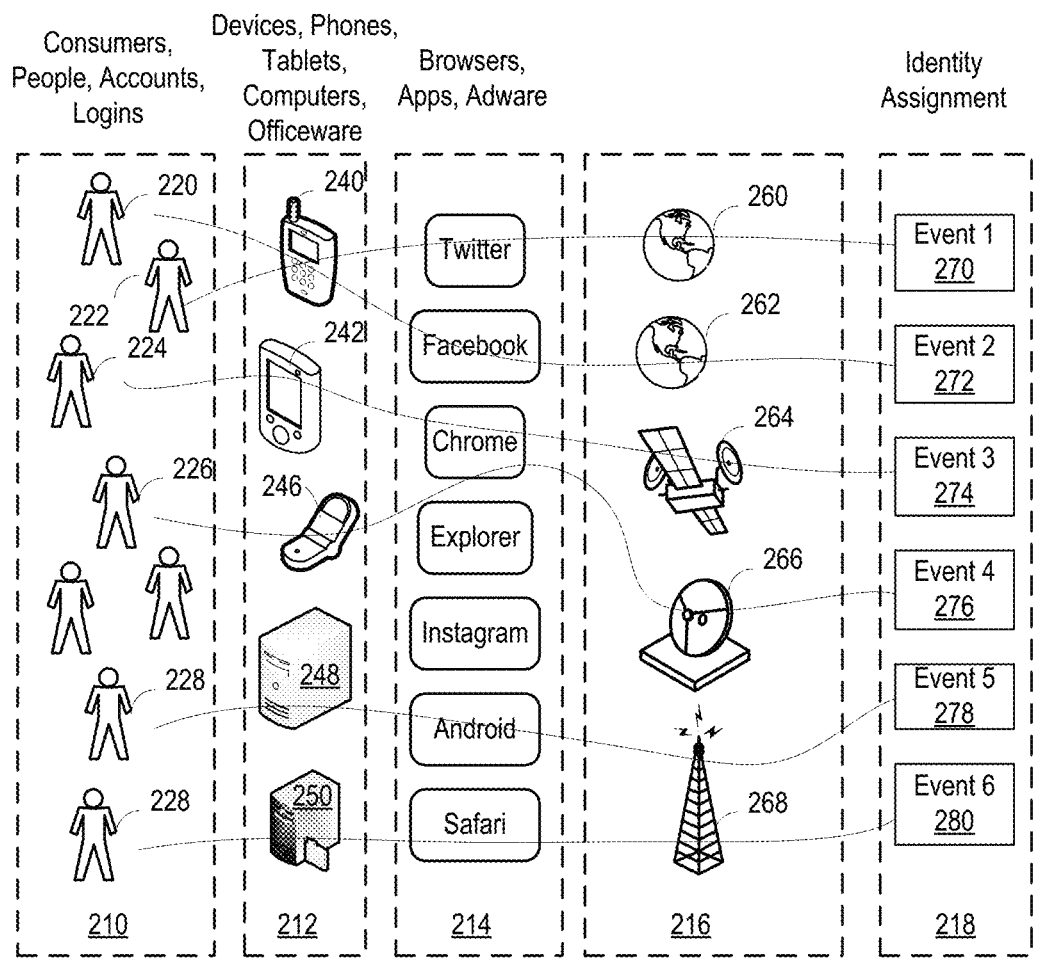
FIG. 2 is a block diagram illustrating communication flow and information used for identifying users.

A significant complication is modern networking on the CPE. At any time and for any reason, the person, device, software layers may choose among different network or radio connectivity methods. As well, the person may traverse about the geographic and networking landscape. It is thus not entirely possible to characterize a contact from an unregistered consumer by virtue of the connection modality. Conceptually this is depicted in FIG. 2.

The connection modality along with SSO usage is, in combination, a very strong signal and may form the core of the identification method. It is from the baseline of consumer registration that the deterministic and probabilistic methods may be based. Deterministic methods unable to be used to acquire intra-device and multi-device estimations against a single person when that consumer is operating on Yahoo O&O and later off Yahoo O&O. Probabilistic methods may be used to estimate identity in the completely anonymous mode, though internet network structure knowledge and the contemporaneous co-occurrences of SSO usage are very helpful in cluster-level group participation estimates.

By way of good project management, deterministic methods as Polka and the non-deterministic methods as Squaredance. Both are characterized as bookkeeeping techniques or sets of algorithms which provide the sorts of estimates necessary to provide complete coverage of the identity estimation problem space. There are substantially two dimensions of concern with multiple gradations within each.

Systems at significant scale acquire obligations to interoperate both with their own previously-committed capabilities as well as the uncontrolled decisions of partner systems. These interoperability obligations form constraints against which the ongoing evolution must be respectful. This section lays out the salient characteristics of the existing advertising identity regimes and their place in the integrated flexible identity estimation stage supported by Polka and Squaredance.

By convention, and supported by various regulatory practices, the identifiers used directly in advertising have the property that they are substantially unique and substantially pseudonymous. Equally important, they are either muted by Yahoo and force-placed on the consumer-premises equipment (CPE) or the CPE itself generates such identifiers as part of its services layer. Significantly, advertising identifiers are construed as to be not considered Personally Identifiable Information (PII), indeed their construction is frequently seeded from entropy sources or one way hashes of other identifiers which do have the undesirable PII properties.

When operating on Yahoo O&O, there are two advertising identifiers: the "B" identifier and the "S" (Supplemental) identifier. The former nominates a software agent (e.g. a browser) or in native adware applications on Android iOS, is unique to the device itself; it is a device identifier. The B identifier is necessarily scoped to Yahoo O&O and also, being stored in an HTML4 cookie, the B Cookie, is subject to the limitations of browser technology such as the various Same Origin Policies restrictions and various sandbox cookie jar technology limitations (e.g. each app has a different cookie jar). A key property of the SID is that once a consumer signs into Yahoo, the SID "sticks" and remains paired with the BID for the lifetime of the B cookie, or until another consumer signs into Yahoo using that same software agent.

Nearly all of the customer premises equipment vendors have begun providing identity services as part of the core operating system functionality. It is only the so called webware/desktop/laptop/officework browsers which do not (yet) provide this service. All of iOS, Android and Windows provide an advertising identifier as part of the core services API. This identifier is coupled with contractual restrictions surrounding its use.

Apple refers to their identifier as Identifier for Advertising (IDFA), and Google refers to the Android one as the Google Play Services Advertising Identifier (GPSAID).

Given the available advertising identifiers, there is a natural partial ordering of preference upon them and a natural escalation path to amplify lower-grade identity tokens into higher-grade ones. Intuitively, for the purposes of marketing, the preference lays out as follows:

it is better to address a person than to address to a device yet it is better to address a device than to address one of many software agents on a device. Yet it is also the possible, because of the co-occurrence properties of certain identifiers that one can escalate one identifier into another if careful records are kept, in real-time and offline, of past co-occurrence patterns. This is the core of the deterministic identity amplification in Polka.

The recording of co-occurrences where a device identifier is present allows for accurate amplification of the IDFA (GPSAID) to an associated SID when the consumer has signed into a Yahoo App and then subsequently appeared to the ad marketplaces, presenting only the IDFA (GPSAID).

Using Polka tables it is possible to reassociate the IDFA (GPSAID) with the consumer's SID-based profile. After the members have been identified the association between multiple members can be addressed in a separate step.

As denoted in block 106, the clusters may be identified. In block 108, members may be assigned to the clusters. Clusters may be thought of as a consumers participation group and may include groupings such as households, workplaces, and neighborhoods. In block 110, the clusters may be stored with associated members. The clusters may be identified and the members may be assigned to clusters separately and independently from the members being identified.

Widening the scope to encompass the fully anonymous, pseudonymous and never signed in consumer requires different methods entirely. These methods provide for an estimation of a consumer's participation in a group, for example a household cluster. What is of interest is the insight that one has to live somewhere, and that is probably with or near other people who are known to the system. The properties of consumer-level IP-based networks and Yahoo SSO may be used to develop a probabilistic assessment of which persons, devices and software agents likely are part of the same cluster.

It is sufficient here to describe here that household cluster identifiers can easily be constructed from IP addresses or standard identifier tokens and that the constituents of a household are expected to evolve over the span of days and weeks, not minutes or hours.

The clusters may be numbered and then profiles may be constructed which describe in broad terms the constituent interests & behaviors which can reasonably be imputed to that household. The generation of the cluster profiles are denoted by block 112 and the profiles may be stored as denoted in block 114. The cluster profiles may be may be generated separately and independently from the clusters being identified and from the members being assigned to the clusters.

Of course, there may be intermediaries and proxies in the path from the consumer to the identity system, but there are sufficient industry-standard methods for declaring this information that infers something about the consumer's location on the network. Of course, there may be significant stretches of time where consumers contact Yahoo solely via the telecommunications network from a few high-traffic IP addresses. Those addresses are able to be identified and their contribution may be discounted.

The system may be utilized to provide an aggregation of profiles that are already known on an individual basis and allow otherwise anonymous contacts to be imputed to those profiles on a probabilistic basis. By means of bookkeeping and probabilistic reasoning the identity system can reasonably amplify an otherwise anonymous contact with an impoverished profile into a far richer profile of the cluster from whence it came.

The cluster system may be integrated into ad systems or content selections systems at serving time by querying both for the best deterministic identifier and also for the cluster implied by the Best ID or IP address. This has the effect of nearly always making available a broad background of cluster-level (e.g. household, workplace, neighborhood, etc.) interest segments to the ad marketplaces.

To be viable, Cluster ID estimation must be computable at runtime with nearly negligible cost. With the Cluster ID available, the precomputed profile for that household cluster can be acquired from the profile store. This is the normal separated two-step process used in targeted advertising: first identity assessment, followed by application of a precomputed profile for that particular identity. In this case clusters (such as households, workplaces, neighborhoods) are being identified rather than persons, devices, software.

Three tables may be utilized which are stored in a low-latency serving store. Let CPE-ID be a variant record derived from one of: BID, SID, IDFA, GPSAID. The tables of Squareance are:

(CPE-ID, IP)→most probable address of this ID.
(CPE-ID, Cluster ID)→the household of this ID.
(Cluster ID, Segment Set)→the household profile Recall that the Household ID is derivable from the IP address by a simple formula that entails address, dates and database version.

The cluster profile construction algorithm may be extremely simplistic. It may simply be the union of the profiles of the persons, devices and browsers which are believed to live in that location. This "algorithm" may be referred to as the dumb union approach. Other approaches to smarter profile construction may be utilized which take into account ancillary considerations such as reach and potency of the segments admitted to the aggregate level.

Within the disclosed system a multi-faceted approach has been provided to the identification of consumers which integrates well with the existing Yahoo O&O consumer registration system yet also provides the flexibility to estimate the identities of consumers who choose not to register with Yahoo but who are served by Yahoo's monetization engines.

The system can provide a deterministic means for estimating the multiple device usage of a single consumer. In Polka the co-occurrence of events with SID and IDFA (GPSAID) in them can be utilized. Record keeping may be used in real-time to accrete a graph of the multiple devices used by a consumer which can then be used in signed-out contexts, such as $3^{rd}$ party ad serving, to identify the person behind the device.

The application of probabilistic methods is also provided to determine the estimation of identity for wholly anonymous consumers and towards identity estimation across the security barriers of the web technologies, the so called Web-to-App and App-to-App problems. To address the different aspects of the problem, a set of algorithms are provided, called Squareance. Central to Squareance for the anonymous consumer case is the notion of clusters (e.g. householding) wherein devices are expected to be associated (e.g. "live together" as do persons), and thus the probabilistic algorithms can reason about the presence of devices and persons appearing together as being associated (e.g. "living together") in a sense that is relevant for marketing use cases of attribution, targeting and retargeting.

In a first process the cluster must be identified and members must be assigned to the cluster. Identified by a certain amount of activity within a certain timeframe from at least one of a given IP address, geo-location, associated accounts, or devices.

The members of the clusters may be defined. Members may be devices, accounts, IP addresses. Ideally clusters representative of a related group of people. The group may be a family or household, or may be workgroup, classmates, etc. Identification and assigning the members to the cluster may be accomplished before and/or independently from the determining a cluster profile. The cluster profile may include segments and more specifically may include facts from the segments.

Segments are created concepts that are relevant for marketing purposes. Segments may be simple directly observable lists such as the list of consumers who have purchased a specific product in the past half year. In some implementations, segments can be constructed around consumers who are believed or expected to behave in a certain way in the future. In one example, these might be consumers who may reasonably present themselves at a "flash sale" at a department store. Other examples may include Animation Movie Shoppers, Used and certified pre owned Cars, Retirement planners, Fast food restaurant lovers, Hikers, and E-book readers.

Ultimately, the system may move down to the fact (feature) level. Whereas segments are composed of combinations of fact (features), it seems to be the case that many segments, as constructed, are "substantially similar" to each other. The conjecture is that moving down to the fact (feature) level will allow for more of the broad background effect to be incorporated into the cluster profiles. The cluster profile may include the intersection of facts from segments in each of the member clusters. In some implementations, the cluster profile may include the intersection of facts from segments in most of or a certain percentage (e.g. 75, 80 or 90%) of the member clusters. The cluster profile may also include the union of recent facts (e.g. facts that have been accessed by that member, that group, or by the general public in the previous time period of a predetermined length).

The cluster profile may also include top revenue generating facts. The top revenue generating facts may be the top x number of facts in revenue generating order or the top x % of revenue generating facts. This may be based on bid revenue for the media company. In some implementations, the top revenue generation may be based on the click through rate for the fact or a number of conversions for the fact.

The cluster profile may also include the union of general interest categories. The general interest categories may be based on general interest in a particular fact, for example numbers representative of how the fact is trending. The cluster profile may also include a union with randomly selection from all the segments. In some implementations, the cluster profile may include a union with randomly selected facts from the segments of the members of the clusters. The randomly selected facts may be limited to facts that are not already part of the cluster profile.

In conjunction with the description provided above, one example of the cluster profile may be determined according to the relationship below:

Cluster Profile=(∩FSR)Cluster∪RF∪TRG∪GIC∪RS

FSR=Facts from Segments from Members of Cluster
RF=Recent Facts
TRG=Top Revenue Generating
GIC=General Interest Categories
RS=Random Section from All the Segments in (Dumb) Union FIG. 2 is a block diagram illustrating how members are identified. Block 210 relates to consumers, people, accounts, or log-ins. Block 212 relates to devices, phones, tablets, computers, and office ware. Block 214 relates to software such as browsers, apps., or adware. Block 216 relates to networks that may be used to communicate with a server. Block 218 relates to the identity assignment of events to members in a server. As discussed previously, when the consumer, people, accounts, or log-ins are known the problem of assigning events to members becomes quite simple. However, often the consumers, people, accounts, or log-ins are not known in a data for anonymous or sudo-anonymous situation. Accordingly, other factors may be used to tie events to particular members. As discussed previously, members may be considered as any of consumers, people, accounts, log-ins, devices, phones, tablets, computers, office ware, browsers, apps., adware in the preferred hierarchy described above. In one example, the user 220 may share a phone 240 with a second user 222. The path for user 220 may include the phone 240, the Facebook application, network 262 to generate event two (272). In a similar manner user 222 may utilize a phone 240, a twitter software network 260 to generate event one (270). While the device 240 is shared other information may be used to distinguish between user 220 and user 222. Distinguishing information may include consumers, people, accounts, log-ins, browsers, apps., adware, and the network used including for example an IP address and other network identifiers.

In another example, user 224 and user 226 may both utilize a chrome application. In one example, user 224 may access the chrome application through a device 242 which then communicates through a network 264 to generate event three (274). In this instance, user 226 may utilize a separate device, for example, a phone 246 to access the chrome application and communicate through a network 266 to generate event four (276). While the application may be shared among user 224 and user 226 the consumers, people, accounts, log-ins, devices such as phones, tablets, computers, office ware, and network path including an IP address and other network identifiers could be used to distinguish between user 224 and user 226. In addition, the time of use in conjunction with those other factors may play an important role in distinguishing between the users such as user 224 and 226.

In another example, the network may be shared, for example, between user 228 and user 230. For example, user 228 may access through a computer 248 using an android software layer through network 268 to generate event five (278). While user 230 may access the computer 250 through a safari software level through network 268 to generate event six (280). In this scenario, network identifiers, for example, an IP address may be similar or the same in the information such as the consumers, people, log-in, accounts, and devices such as phones, tablets, computers, office ware, and the software such as browsers, apps., and adware may be used to distinguish user 228 and 230. As described above, time may also be a significant factor in conjunction with the other information identified above to distinguish between user 228 and 230. While FIG. 2 identifies what attributes in communication may be different to aid in distinguishing members. Attributes that the members have in common such as, geolocation, timing, IP address, network type, network path, consumers, people, log-in, accounts, and devices such as phones, tablets, computers, office ware, and the software such as browsers, apps., and adware may be used to place the members in clusters.

Figure 3:
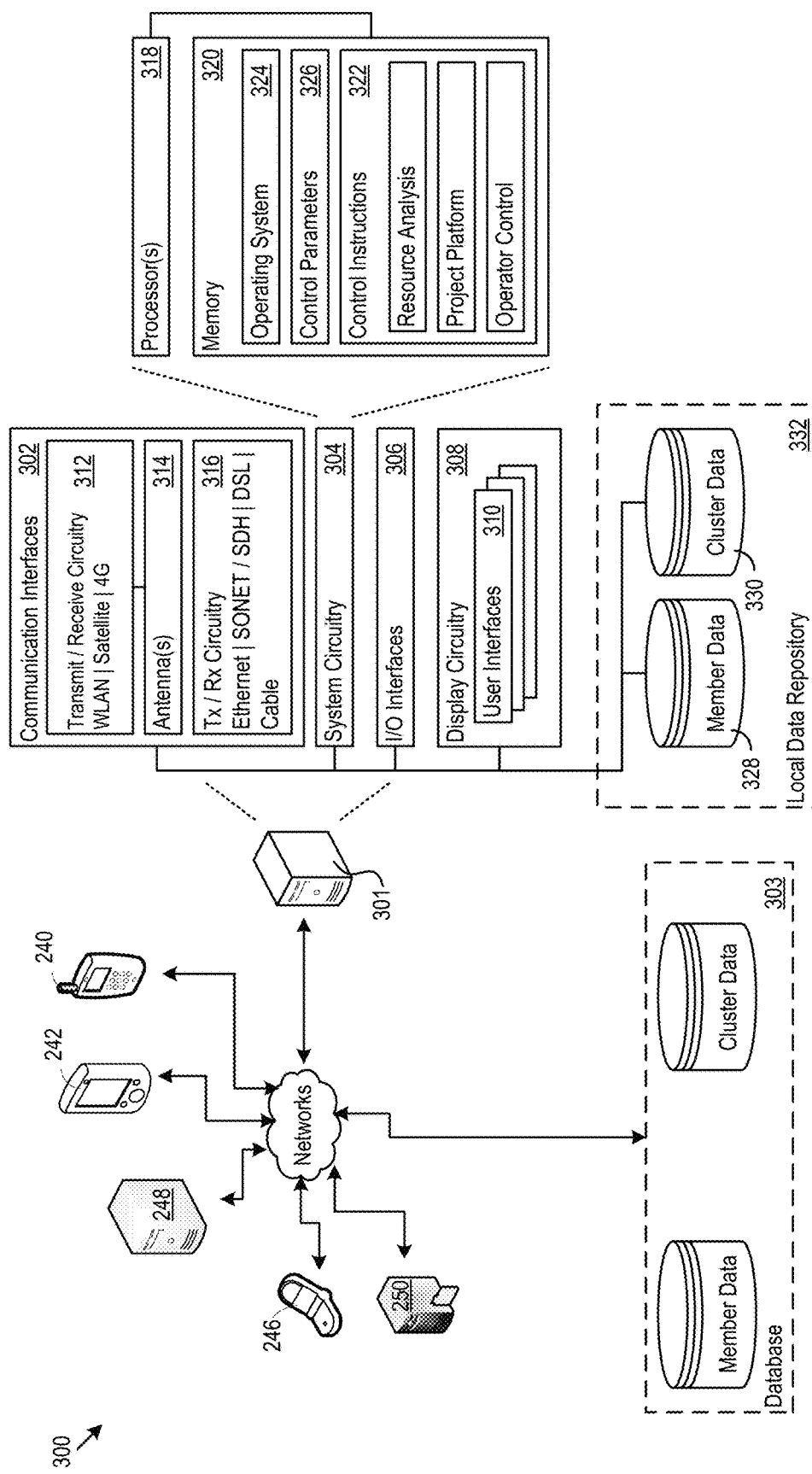
FIG. 3 is a block diagram of a system for generating cluster profiles.

FIG. 3 is a block diagram of a system 300 for generating a cluster profile. The system 300 may include a server 301 that communicate with a number of devices or various networks. The devices may include a large number of consumers owned equipment, for example, cell phones 240, tablets 242, computers 248, personal assistant and wearables such as device 246 and virtualized servers 250. Users may log on to these various devices as described with respect to FIG. 2 and the server 301 may identify the various events and how they relate to different members to generate member profiles. Server 301 may then in a separate and independent step determine which members may be associated with particular clusters. Clusters may be representative of members that are tied together geographically and also within certain time bands. Examples of clusters may be households, neighborhoods, work places, classmates, or other similar groupings. The member profiles and the member groupings may be stored in the database 303 in a remote location via the network or in a local data repository 332 to the server 301.

The server 301 includes communication interfaces 302, system circuitry 304, input/output (I/O) interfaces 306, and display circuitry 308 that generates user interfaces 310 locally or for remote display, e.g., in a web browser running on a local or remote machine through which a project is defined and resources are selected, evaluated, allocated, and connected to a project. The user interfaces 310 and the I/O interfaces 306 may include graphical user interfaces (GUIs), touch sensitive displays, voice or facial recognition inputs, buttons, switches, speakers and other user interface elements. Additional examples of the I/O interfaces 306 include microphones, video and still image cameras, headset and microphone input/output jacks, Universal Serial Bus (USB) connectors, memory card slots, and other types of inputs. The I/O interfaces 306 may further include magnetic or optical media interfaces (e.g., a CDROM or DVD drive), serial and parallel bus interfaces, and keyboard and mouse interfaces.

The communication interfaces 302 may include wireless transmitters and receivers ("transceivers") 312 and any antennas 314 used by the transmit and receive circuitry of the transceivers 312. The transceivers 312 and antennas 314 may support WiFi network communications, for instance, under any version of IEEE 802.11, e.g., 802.11n or 802.11ac. The communication interfaces 302 may also include wireline transceivers 316. The wireline transceivers 316 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 304 may include any combination of hardware, software, firmware, or other circuitry. The system circuitry 304 may be implemented, for example, with one or more systems on a chip (SoC), application specific integrated circuits (ASIC), microprocessors, discrete analog and digital circuits, and other circuitry. The system circuitry 304 is part of the implementation of any desired functionality in the server 301. As just one example, the system circuitry 304 may include one or more instruction processors 318 and memories 320. The memory 320 stores, for example, control instructions 322 and an operating system 324. In one implementation, the processor 318 executes the control instructions 322 and the operating system 324 to carry out any desired functionality for the server 301. The control parameters 326 provide and specify configuration and operating options for the control instructions 322, operating system 324, and other functionality of the server 301.

The server 301 may include a local data repository 332 that includes volume storage devices, e.g., hard disk drives (HDDs) and solid state disk drives (SDDs). The storage devices may define and store databases that the control instructions 322 access, e.g., through a database control system, to perform the functionality implemented in the control instructions 322. In the example shown, the databases include a member data 328 and a cluster data 330. In other implementations, any of the databases may be part of a single database structure, and, more generally, may be implemented logically or physically in many different ways. Each of the databases defines tables storing records that the control instructions 322 read, write, delete, and modify to perform the processing noted below. The system circuitry 304 may implement the resource analysis circuitry, project platform circuitry, and the operator control circuitry, e.g., as control instructions 322 executed by the processor 318.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

We claim:
1. A system, comprising:
a server configured to receive event information from a plurality of consumer devices; and
a database storing a plurality of member profiles;
wherein the server is configured to:
retrieve the plurality of member profiles from the database;
determine a subset of member profiles, of the plurality of member profiles, to associate with a cluster;
calculate an intersection of facts from the subset of member profiles;
generate a cluster profile based on the intersection of the facts from the subset of member profiles, wherein the cluster profile is generated based on a union of recent facts determined to have occurred within a time period of a defined length;
determine a single event generated by an anonymous contact;
determine a plurality of attribute identifiers, of the anonymous contact, used to generate the single event;

analyze the plurality of attribute identifiers used to generate the single event to determine, based upon the plurality of attribute identifiers used to generate the single event, an estimation of an identity for the anonymous contact that generated the single event, wherein the estimation of the identity is based on a combination of:
   a device identifier corresponding to a device, of the anonymous contact, used to generate the single event,
   an application identifier corresponding to an application, of the anonymous contact, used to generate the single event, and
   a network identifier corresponding to a network, of the anonymous contact, used to generate the single event;
responsive to determining that the anonymous contact is likely associated with the cluster, associate the anonymous contact with the cluster profile using the identity, for the anonymous contact associated with the single event, estimated using the combination of the device identifier, the application identifier and the network identifier;
select content for the anonymous contact based on the cluster profile;
transmit the content to a consumer device associated with the anonymous contact; and
determine an estimation of a second identity for a second anonymous contact associated with a second event based on a combination of:
   the device identifier corresponding to the device, of the anonymous contact, based on a determination that the device used to generate the single event in association with the anonymous contact was also used to generate the second event,
   a second application identifier corresponding to a second application, of the second anonymous contact, used to generate the second event, and
   a second network identifier corresponding to a second network, of the second anonymous contact, used to generate the second event,
wherein the second identity of the second anonymous contact associated with the second event is distinguished, by the server, from the identity of the anonymous contact associated with the single event, despite the second event and the single event both being generated using the same device, based upon at least one of:
   the second application identifier corresponding to the second application used to generate the second event being different than the application identifier corresponding to the application used to generate the single event; or
   the second network identifier corresponding to the second network used to generate the second event being different than the network identifier corresponding to the network used to generate the single event.

2. The system according to claim 1, wherein the recent facts are facts that have been accessed within the time period of the defined length by at least one of a member associated with the cluster or a group associated with the cluster.

3. The system according to claim 1, wherein the server is configured to:
   responsive to determining that the second anonymous contact is likely associated with a second cluster associated with a second cluster profile, associate the second anonymous contact with the second cluster profile using the second identity, for the second anonymous contact associated with the second event, estimated using the combination of the device identifier, the second application identifier and the second network identifier.

4. The system according to claim 3, wherein the server is configured to:
   select second content for the second anonymous contact based on the second cluster profile; and
   transmit the second content to a second consumer device associated with the second anonymous contact.

5. The system according to claim 1, wherein the server is configured to:
   determine an estimation of a third identity for a third anonymous contact associated with a third event based on a combination of:
      a second device identifier corresponding to a second device, of the third anonymous contact, used to generate the third event,
      the application identifier corresponding to the application, of the anonymous contact, based on a determination that the application used to generate the single event in association with the anonymous contact was also used to generate the third event, and
      a third network identifier corresponding to a third network, of the third anonymous contact, used to generate the third event.

6. The system according to claim 5, wherein the server is configured to:
   responsive to determining that the third anonymous contact is likely associated with a second cluster associated with a second cluster profile, associate the third anonymous contact with the second cluster profile using the third identity, for the third anonymous contact associated with the third event, estimated using the combination of the second device identifier, the application identifier and the third network identifier;
   select second content for the third anonymous contact based on the second cluster profile; and
   transmit the second content to a second consumer device associated with the third anonymous contact.

7. The system according to claim 1, wherein the server is configured to:
   determine an estimation of a third identity for a third anonymous contact associated with a third event based on a combination of:
      a second device identifier corresponding to a second device, of the third anonymous contact, used to generate the third event,
      a third application identifier corresponding to a third application, of the third anonymous contact, used to generate the third event, and
      the network identifier corresponding to the network, of the anonymous contact, based on a determination that the network used to generate the single event in association with the anonymous contact was also used to generate the third event.

8. The system according to claim 1, wherein the second identity of the second anonymous contact associated with the second event is distinguished, by the server, from the identity of the anonymous contact associated with the single event, despite the second event and the single event both being generated using the same device, based upon the second application identifier corresponding to the second application used to generate the second event being different than the application identifier corresponding to the application used to generate the single event.

9. The system according to claim 1, wherein the second identity of the second anonymous contact associated with the second event is distinguished, by the server, from the identity of the anonymous contact associated with the single event, despite the second event and the single event both being generated using the same device, based upon the second network identifier corresponding to the second network used to generate the second event being different than the network identifier corresponding to the network used to generate the single event.

10. A system, comprising:
    a server configured to receive event information from a plurality of consumer devices; and
    a database storing a plurality of member profiles;
    wherein the server is configured to:
        retrieve the plurality of member profiles from the database;
        determine a subset of member profiles, of the plurality of member profiles, to associate with a cluster;
        calculate an intersection of facts from the subset of member profiles;
        generate a cluster profile based on the intersection of the facts from the subset of member profiles;
        determine a single event generated by an anonymous contact;
        determine a plurality of attribute identifiers, of the anonymous contact, used to generate the single event;
        analyze the plurality of attribute identifiers used to generate the single event to determine, based upon the plurality of attribute identifiers used to generate the single event, an estimation of an identity used by the anonymous contact that generated the single event, wherein the identity is estimated based on a combination of at least two of:
            a device identifier corresponding to a device, of the anonymous contact, used to generate the single event,
            an application identifier corresponding to an application, of the anonymous contact, used to generate the single event, or
            a network identifier corresponding to a network, of the anonymous contact, used to generate the single event;
        responsive to determining that the anonymous contact is likely associated with the cluster, associate the anonymous contact with the cluster profile using the identity for the anonymous contact associated with the single event;
        select content for the anonymous contact based on the cluster profile; and
        transmit the content to a consumer device associated with the anonymous contact; and
        determine an estimation of a second identity used by a second anonymous contact to generate a second event, wherein the second identity is estimated based on a combination of at least two of:
            the device identifier corresponding to the device, of the anonymous contact, based on a determination that the device used to generate the single event in association with the anonymous contact was also used to generate the second event,
            a second application identifier corresponding to a second application, of the second anonymous contact, used to generate the second event, or
            a second network identifier corresponding to a second network, of the second anonymous contact, used to generate the second event, wherein the network identifier is an IP address and the second network identifier is a second IP address,
        wherein the second identity of the second anonymous contact associated with the second event is distinguished, by the server, from the identity of the anonymous contact associated with the single event, despite the second event and the single event both being generated using the same device, based upon at least one of:
            the second application identifier corresponding to the second application used to generate the second event being different than the application identifier corresponding to the application used to generate the single event; or
            the second network identifier corresponding to the second network used to generate the second event being different than the network identifier corresponding to the network used to generate the single event.

11. The system according to claim 10, wherein the server is configured to:
    determine an estimation of a third identity used by a third anonymous contact to generate a third event, wherein the third identity is estimated based on a combination of at least two of:
        a second device identifier corresponding to a second device, of the third anonymous contact, used to generate the third event,
        a third application identifier corresponding to a third application, of the third anonymous contact, used to generate the third event, or
        the network identifier corresponding to the network, of the anonymous contact, based on a determination that the network used to generate the single event in association with the anonymous contact was also used to generate the third event.

12. The system according to claim 10, wherein the server is configured to:
    determine an estimation of a third identity used by a third anonymous contact to generate a third event, wherein the third identity is estimated based on a combination of at least two of:
        a second device identifier corresponding to a second device, of the third anonymous contact, used to generate the third event,
        the application identifier corresponding to the application, of the anonymous contact, based on a determination that the application used to generate the single event in association with the anonymous contact was also used to generate the third event, or
        a third network identifier corresponding to a third network, of the third anonymous contact, used to generate the third event, wherein the third network identifier is a third IP address.

13. A method, comprising:
    receiving event information from a plurality of consumer devices;
    retrieving a plurality of member profiles from a database;
    determining a subset of member profiles, of the plurality of member profiles, to associate with a cluster;
    calculating an intersection of facts from the subset of member profiles;
    generating a cluster profile based on the intersection of the facts from the subset of member profiles;

determining a single event generated by an anonymous contact;

determining a plurality of attribute identifiers, of the anonymous contact, used to generate the single event;

analyzing the plurality of attribute identifiers used to generate the single event to determine, based upon the plurality of attribute identifiers used to generate the single event, an estimation of an identity used by the anonymous contact that generated the single event, wherein the identity is estimated based on a combination of:

a first attribute identifier corresponding to a first attribute, of the anonymous contact, used to generate the single event, wherein the first attribute is a first type of attribute, a second attribute identifier corresponding to a second attribute, of the anonymous contact, used to generate the single event, wherein the second attribute is a second type of attribute, and a network identifier corresponding to a network, of the anonymous contact, used to generate the single event;

responsive to determining that the anonymous contact is likely associated with the cluster, associating the anonymous contact with the cluster profile using the identity for the anonymous contact associated with the single event;

selecting content for the anonymous contact based on the cluster profile;

transmitting the content to a consumer device associated with the anonymous contact;

determining a single second event generated by a second anonymous contact;

determining a plurality of second attribute identifiers, of the second anonymous contact, used to generate the single second event; and analyzing the plurality of second attribute identifiers used to generate the single second event to determine, based upon the plurality of second attribute identifiers used to generate the single second event, an estimation of a second identity used by the second anonymous contact that generated the single second event, wherein the second identity is estimated based on a combination of:

the first attribute identifier corresponding to the first attribute, of the anonymous contact, based on a determination that the first attribute used to generate the single event in association with the anonymous contact was also used to generate the single second event, a fourth attribute identifier corresponding to a fourth attribute, of the second anonymous contact, used to generate the single second event, wherein the fourth attribute is the second type of attribute, and a second network identifier corresponding to a second network, of the second anonymous contact, used to generate the single second event, wherein the second identity of the second anonymous contact associated with the single second event is distinguished from the identity of the anonymous contact associated with the single event, despite the single second event and the single event both being generated using the same first attribute, based upon at least one of:

the fourth attribute identifier corresponding to the fourth attribute used to generate the single second event being different than the second attribute identifier corresponding to the second attribute used to generate the single event; or the second network identifier corresponding to the second network used to generate the single second event being different than the network identifier corresponding to the network used to generate the single event.

14. The method according to claim 13, comprising:

responsive to determining that the second anonymous contact is likely associated with a second cluster associated with a second cluster profile, associate the second anonymous contact with the second cluster profile using the second identity used by the second anonymous contact to generate the single second event;

selecting second content for the second anonymous contact based on the second cluster profile; and transmitting the second content to a second consumer device associated with the second anonymous contact.

15. The method according to claim 13, wherein the first attribute corresponds to a device used by the anonymous contact to generate the single event and used by the second anonymous contact to generate the single second event.

16. The method according to claim 13, wherein the first attribute corresponds to an application used by the anonymous contact to generate the single event and used by the second anonymous contact to generate the single second event.

17. The method according to claim 13, wherein the second type of attribute corresponds to an application and the first type of attribute corresponds to a device.

* * * * *